United States Patent [19]

Schulz

[11] 3,870,335

[45] Mar. 11, 1975

[54] STEERING ARRANGEMENT FOR MOTOR VEHICLES

[75] Inventor: Waldemar Schulz, Dannenbuettel, Germany

[73] Assignee: Volkswagenwerk Aktiengesellschaft, Wolfsburg, Germany

[22] Filed: July 5, 1973

[21] Appl. No.: 376,339

[30] Foreign Application Priority Data
July 25, 1972  Germany.............................. 2236379

[52] U.S. Cl. ................................................ 280/90
[51] Int. Cl. ............................................. B62d 3/00
[58] Field of Search ......................... 280/89, 90, 96

[56] References Cited
UNITED STATES PATENTS

| | | | |
|---|---|---|---|
| 2,955,667 | 10/1960 | Cota | 280/90 |
| 3,074,515 | 1/1963 | MacLellan | 280/90 |
| 3,779,575 | 12/1973 | Mazur | 280/90 |
| 3,801,125 | 4/1974 | Gotzenberger et al. | 280/96 |

FOREIGN PATENTS OR APPLICATIONS

| | | | |
|---|---|---|---|
| 762,412 | 5/1954 | Germany | 280/90 |

*Primary Examiner*—Kenneth H. Betts
*Assistant Examiner*—Jack D. Rubenstein
*Attorney, Agent, or Firm*—Ernest F. Marmorek

[57] ABSTRACT

In a motor vehicle, a fixedly supported steering gear is coupled to a steering wheel, at least a pair of tie rods each of which is coupled to one of the vehicle wheels, a force translating member, such as the pinion-rack, is mounted transversely with respect to the longitudinal axis of the vehicle and being coupled to the steering gear and being operably coupled to the tie rods, a shock absorbing arrangement mounted at one end of the force translating member co-axially therewith and including a pipe and a piston in it for moving telescopically therein, the pipe being rigidly coupled to one end of the force translating member, the pipe at least partially protruding into a fixed receptor to which the piston of the shock absorbing arrangement is fixedly coupled while the fixed receptor is fixedly coupled to the vehicle frame.

9 Claims, 2 Drawing Figures

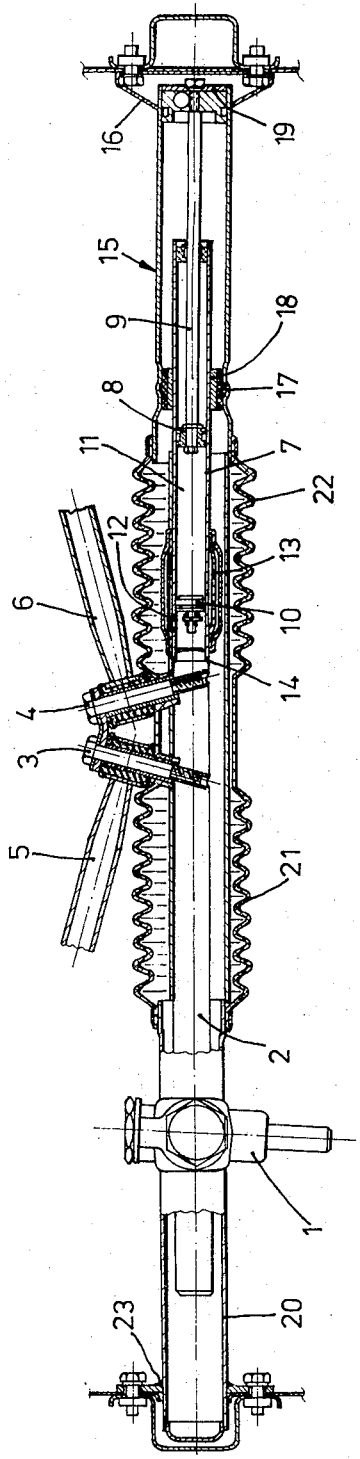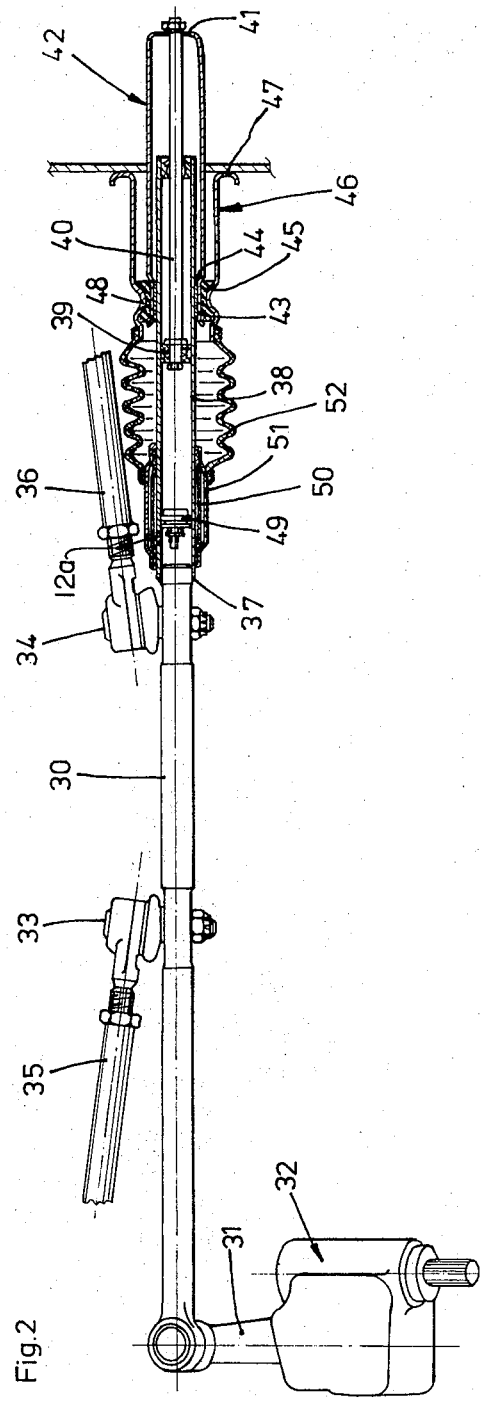

3,870,335

STEERING ARRANGEMENT FOR MOTOR VEHICLES

FIELD OF THE INVENTION

The present invention relates to steering arrangements in motor vehicles in general and, more particularly it relates to a shock absorbing arrangement associated with the steering mechanism of motor vehicles.

BACKGROUND OF THE INVENTION

The conventional steering arrangements which are used in the motor vehicles are provided with steering shock absorbers which are arranged parallel or at an angle with respect to the toothed rack of the steering gear and built into the region of the tie rods. One of the disadvantages of such an arrangement is that they require a considerable space for mounting.

Attempts have been made in the past to improve shock absorbers in connection with the steering arrangements in order to build such shock absorbers into other portions of the steering arrangements. Such an attempt is proposed by German Pat. No. 1,082,812 which describes a shock absorber arrangement for the steering mechanism as being built into the steering mechanism in a manner that the female part for the steering spindle is constructed as a damping piston. Inasmuch as such a damping piston can operate only on a small path, large forces are required between the shock absorbing arrangement which in turn can lead to critical requirements in the design of the overall arrangement.

These apparent disadvantages are attempted to be overcome by the teaching of U.S. Pat. No. 2,588,682 which describes an arrangement in which the output of the steering gear operates directly on the two tie rods each of which is coupled with one of the steering levers of one of the wheels of the vehicle. Along at least one of the tie rods a shock absorber of the above described type is arranged in order to satisfy the object of that arrangement and, namely, to prevent the translation of shocks or shakes coming from one of the wheels, to the other of the wheels. Such individual damping of the shakes affecting the individual wheels may lead, however, during passing of a curve or during strong side wind effects, to the self-steering of the individual wheels.

Improvements have been also proposed by German Pat. No. 762,412 in the field of the integrated steering shock absorbers. This patent proposes a steering arrangement for motor vehicles in which the steering gear which is fixedly mounted and coupled to a steering wheel is connected at its output with the tie rods which in turn are each connected to one of the vehicle wheels, and provides that the steering gear is coupled with a rod-like force translating member mounted approximately transversely with the longitudinal axis of the vehicle, at one end of such a force translating member, a pipe is arranged in which the shock absorber is built into co-axially in the form of a piston. In the proposed arrangement, the rod-like force translating member is formed directly by the toothed rack of the steering gear. Also in the proposed arrangement of German Pat. No. 762,412 the entire steering shock absorber consisting of the piston rod and the piston is fixedly mounted on one of the free ends of the rack of the steering gear and, the entire shock absorber of the steering gear at the same time forms a free continuity of the toothed rack and not being connected with other parts.

SUMMARY OF THE INVENTION

It is, therefore, the object of the present invention to provide an improved steering arrangement for motor vehicles in which the shock absorbing arrangement for the steering gear is integrated into the already available members of the steering arrangement.

It is another object of the present invention to provide an improved steering arrangement and a shock absorbing mechanism therefor in which the force translating members includes a middle cross-tie coupled with the crank drive on the steering wheel or it is formed by such a tie rod.

It is a further object of the present invention to provide an improved steering arrangement for motor vehicles having an improved shock absorbing arrangement in which the shock absorber simultaneously serves for supporting the force translating member as well as the toothed rack of the steering gear or the middle tie rod.

According to the present invention the housing of the shock absorber is rigidly mounted on the steering arrangement on the end of its force translating member and it partially protrudes into a fixed receptor or retaining means and is movable only in the axial direction, and in which the piston arrangement is fixedly mounted on the vehicle frame.

Due to the fact that the pipe of the shock absorber of the steering arrangement according to the present invention is rigidly mounted on the rack-like force translating member, the high moment of resistance of the cross-section of the pipe of the steering shock absorber is made use of for supporting the force translating member. In the event the piston arrangement would be rigidly mounted on one of the ends of the force translating member, then the piston rod would require a relatively large cross-section. Since this is not the case in the embodiment according to the present invention, then the piston rod can be constructed relatively thin.

In order that a relatively large region on the rod-like force translating member would be available for the coupling of the tie rod, the invention provides that the coupling points on the force translating member lie between the steering gear and the steering shock absorber.

According to the preferred embodiment of the present invention, the fixed receptor or retaining means is constructed from a supporting pipe having an elastic transverse spacer support lying between the supporting pipe and the pipe of the steering shock supporter including also a sliding support for the pipe. The pipe of the steering shock absorber is practically freely movable in the axial direction, however, it is elastically supported in all directions running transversely to its axis. The supporting pipe can be provided with a transverse wall therein in which the piston arrangement is fixedly supported in the axial direction, and in this case, the elastic transverse spacer support is constructed at the same time as a slide support.

According to another aspect of the present invention, between the elastic transverse spacer support and the pipe of the steering shock absorber, a supporting pipe having a transverse wall therein is placed and is axially fixed by the elastic transverse spacer support. In such a supporting pipe, the piston arrangement is mounted in the axial direction and the supporting pipe is constructed as a slide support in a region which surrounds the pipe of the steering shock absorber.

According to the above construction, there are a pair of concentric pipes provided, namely, the supporting pipe and the retaining pipe which supports the two parts of the steering shock absorber. The region of the retaining pipe which surrounds the pipe of the steering shock absorber may have a reduced diameter and can simultaneously carry the transverse spacer supporting means which is formed as a ring. In this construction the sliding support for the pipe of the steering shock absorber and the elastic transverse spacer support lie above each other.

BRIEF DESCRIPTION OF THE DRAWINGS

The invention will become more readily apparent from the following description of preferred embodiments thereof shown in the accompanying drawings, in which:

FIG. 1 is a partial sectional plan view of the improved steering arrangement with a shock absorber according to the present invention, in which the rod-like force translating element is formed by the toothed rack of the steering gear; and FIG. 2 is a similar view as FIG. 1 in which the force translating element is formed by a intermediate tie rod and in which, however, the shock absorber is supported differently from the support thereof in FIG. 1.

DESCRIPTION OF THE DIFFERENT EMBODIMENTS

For conventional elements of coupling the tie rods to the vehicle wheels or other elements of the steering gear not shown in the figures herein, reference should be had to the aforementioned patents. Now, with reference to FIG. 1, it is seen that conventionally the steering gear 1 includes a toothed rack 2 to which, by means of bolts 3 and 4 the tie rods 5 and 6 are secured allowing pivoting on a plane. The tie rods 5 and 6 are coupled in a conventional manner to steering levers which are not shown and which, in turn, each is coupled to a vehicle wheel. From left to right, as viewed in FIG. 1, the toothed rack 2 is provided according to the present invention, with a steering shock absorber, which includes a pipe 7 and a piston arrangement which comprises a piston 8 and a piston rod 9. Between the piston 8 and the bottom valve 10, in the pipe 7, a chamber 11 is formed which is filled with a pressurized medium. In the event shakes or oscillations are present, then through openings provided in the bottom valve 10, the pressurized medium leaves the chamber 11 and enters through the recesses or openings 12 of the hydraulic expansion bellows 13.

According to one aspect of the present invention, the right end of the toothed rack 2, as viewed in FIG. 1, is rigidly connected, here by being welded at 14, to the pipe 7 of the steering shock absorber. The pipe 7 partially protrudes into the retaining or supporting pipe 15 which, at its right end, when viewed in FIG. 1, is rigidly connected to the vehicle frame with a supporting means 16. Furthermore, the supporting pipe 15 contains an elastic transverse spacer support means 17 for the pipe 7 of the steering shock absorber, which at its inner surface surrounding the pipe 7 is constructed as a sliding journal support 18. The relatively large diameter of the pipe 7, having a high moment of resistance, is used simultaneously as a support for the toothed rack 2. The piston arrangement 8 and 9 of the shock absorber is thereby freed from such supporting forces and, therefore, the piston arrangement 8 and 9 itself does not have to be constructed extremely rigidly. The piston rod 9 at its end, lying opposite to the piston 8, is fixedly bolted on the transverse wall 19 of the supporting pipe 15 so that when shocks or oscillation are present, the pipe 7 can move relatively with respect to the fixedly mounted piston 8.

As can be also seen in FIG. 1, the fact that the coupling points for the tie rods 5 and 6 on the toothed rack 2 are provided between the steering gear 1 and the shock absorber 8, 9, there is relatively plenty of space available for designing and selecting a desired point for such coupling.

The supporting or retaining pipe 15 at the same time forms a part of a tight housing for the toothed rack 2 and the shock absorber 8 and 9 and, which further includes the pot-like element 20 at the left side of the steering gear 1, when viewed in FIG. 1, as well as the flexible sleeves 21 and 22. The pot-like element 20 is also securely connected to the vehicle frame as indicated at 23.

While in the embodiment illustrated in FIG. 1, the force translating element has been a component member of the steering gear, namely, the toothed rack 2, the embodiment illustrated in FIG. 2 employs for the force translating element a intermediate tie rod 30 which is coupled with a crank 31 of the steering gear 32. To the intermediate tie rod 30 there are at 33 and 34 a pair of tie rods 35 and 36 coupled for pivoting in a plane and each of which is associated with one of the vehicle wheels. Also in this embodiment the right end of the intermediate tri rod 30 a shock absorber built into the steering gear, the details of construction of which are similar to the one described in connection with FIG. 1. Onto the free end of the intermediate tie rod 30a here again, by welding at 37, the pipe 38 of the shock absorber is rigidly connected. The pipe 38 contains the piston 39 and the piston rod 40 which is bolted onto the transverse wall 41 of the supporting pipe 42 for movement in the axial direction. The supporting or retaining pipe 42 forms, with its reduced diameter, in a region 43 which is provided with a sliding support 44, a sliding support for the pipe 38 of the shock absorber. The region 43 carries, on its outer circumference, a rubber support 45 which forms the elastic transverse support for the pipe 38 of the shock absorber between a retaining sleeve 46. The retaining sleeve 46 is, at its right-hand region when viewed in FIG. 2, fixedly secured to the vehicle frame while the retaining or supporting pipe 42 is supported in the axial direction only by means of the formation of its region 43 between the rubber support 45. In order to fixedly support the rubber support 45, the retaining sleeve 46 is provided with a profile region 48 which pinches into the rubber support 45 so that it cannot move in the axial direction.

It is noted that the shock absorber in FIG. 2 is also provided with a bottom valve 49 in its pipe 38 as well as with an expansion bellows 50. A tight housing is formed here, again, by the housing 51 of the expansion bellows 50 and by means of a sealing sleeve 52. The expansion bellows 50 receives the hydraulic fluid also through recesses or openings 12a similar to the openings 12 in FIG. 1.

I wish it to be understood that I do not desire to be limited to the exact details of construction shown and described, for obvious modifications will occur to a person skilled in the art.

Having thus described the invention, what I claim as new and desire to be secured by Letters Patent, is as follows:

1. In a motor vehicle, a fixedly supported steering gear coupled to a steering wheel, at least a pair of tie rods, each coupled to one of the vehicle wheels, a force translating member mounted shiftable transversely with respect to the longitudinal axis of the vehicle and coupled to said steering gear and operably coupled to said tie rods, a shock absorbing means mounted at one end of said force translating member co-axially therewith, said shock absorbing means comprising a pipe means and a piston means placed operably in said pipe means for moving telescopically therein, said pipe means of said shock absorbing means being rigidly coupled to said one end of said force translating member, a fixed retaining means, said pipe means at least partially protruding into said fixed retaining means, said piston means for said shock absorbing means being fixedly coupled to the vehicle frame.

2. The combination as claimed in claim 1, wherein said tie rod means are coupled to said force translating member between said steering gear and said shock absorbing means.

3. The combination as claimed in claim 1, wherein said force translating means comprises a toothed rack means of said steering gear means.

4. The combination as claimed in claim 1, wherein said force translating means comprises an intermediate tie rod means coupled to a crank arm means of said steering gear means.

5. The combination as claimed in claim 1, wherein said shock absorber means comprises a hydraulic arrangement including an expansion bellows means.

6. The combination as claimed in claim 1, wherein said fixed retaining means comprises a retaining pipe means, an elastic transverse spacer support means placed between said retaining pipe means and the pipe means of said shock absorber means, and a journal means for said pipe means.

7. The combination as claimed in claim 6, wherein said retaining pipe means has a transverse wall portion, means for coupling said piston means of said shock absorbing means to said transverse wall portion and fixedly securing said piston means in the axial direction, said transverse spacer means including said journal means.

8. The combination as claimed in claim 1, wherein said retaining means includes a retaining pipe means fixedly supported on the vehicle frame and having a transversely extending wall, said piston means being fixedly coupled to said wall and thereby to said vehicle frame, resilient means for mounting said pipe means in said retaining means, a region of said retaining means being constructed as a journal means supporting said shock absorber means.

9. The combination as claimed in claim 8, wherein said region has a portion having a reduced diameter, said resilient mounting means being a ring-shaped spacer engaged by said reduced diameter portion.

* * * * *